United States Patent [19]
Popovic et al.

[11] Patent Number: 5,276,631
[45] Date of Patent: Jan. 4, 1994

[54] PROCESS FOR AUTOMATIC CALIBRATION OR RE-CALIBRATION OF MEASUREMENTS OF A PHYSICAL VARIABLE

[75] Inventors: Radivoje Popovic, Zug; Beat Hälg, Cham, both of Switzerland

[73] Assignee: Landis & Gyr Betriebs AG, Zug, Switzerland

[21] Appl. No.: 662,848

[22] Filed: Mar. 1, 1991

[30] Foreign Application Priority Data

Mar. 28, 1990 [CH] Switzerland .................. 01030/90

[51] Int. Cl.$^5$ .................. H01J 5/16; G06F 15/20
[52] U.S. Cl. .................. 364/571.04; 73/1 R; 356/375; 250/227.11; 385/88
[58] Field of Search .......... 364/571.01, 571.02, 364/571.04, 571.05, 577, 553, 558, 557, 561; 250/227.11; 385/12, 13, 88; 73/1; 356/375

[56] References Cited

U.S. PATENT DOCUMENTS

| | | | |
|---|---|---|---|
| 4,446,715 | 5/1984 | Bailey | 73/1 R |
| 4,488,813 | 12/1984 | Kissinger et al. | 250/227.11 |
| 4,861,131 | 8/1989 | Bois et al. | 385/12 |
| 5,051,578 | 9/1991 | Slemon et al. | 385/88 |
| 5,162,661 | 11/1992 | Sato et al. | 356/375 |

OTHER PUBLICATIONS

Emanuel Bois et al "Loss Compensated Fiber Optic Displacement Sensor Including a Lens", Applied Optics, 1 Feb. 1989 vol. 28, No. 3, pp. 419-420.
F. E. Wagner "Process Measurement by Self-Calibrating Measuring Systems", Acta Imeko, 1982, pp. 467-477.

*Primary Examiner*—Jack B. Harvey
*Assistant Examiner*—Ellis B. Ramirez
*Attorney, Agent, or Firm*—Meltzer, Lippe, Goldstein, Wolf, Schlissel & Sazer

[57] ABSTRACT

A calibration process utilizes two nearly identical sensors. The characteristic output curve of the first sensor is obtained using the measuring outputs of the second sensor. In particular, the first sensor has a characteristic output curve f[x] where x is a physical variable to be measured. The second sensor has an output curve $y[x] \approx f[x+a]$. Starting from an initially known portion of the curve f[x], outputs of the second sensor are utilized to extend the known portion of the characteristic output curve f[x] of the first sensor into ranges of the variable x where this function is not yet known.

9 Claims, 4 Drawing Sheets

PROCESS FOR AUTOMATIC CALIBRATION OR RE-CALIBRATION OF MEASUREMENTS OF A PHYSICAL VARIABLE

FIELD OF THE INVENTION

The present invention relates to a process for the automatic calibration or re-calibration of a sensor for measuring a physical variable.

BACKGROUND OF THE INVENTION

Such processes are for example suitable to measure distances, magnetic fields, pressure differences etc. when the characteristic output curve of the sensor used for the measurement is not linear and is either unknown at the beginning or unstable, so that in the latter case, although originally known, it has changed in the meantime as a function of time, temperature or some other factor in an unknown manner so that it is again unknown and must be recalibrated. In this process values of a function f[x] of the physical variable x are measured. However not the values of the function f[x] but the values $x=f^{-1}[x]$ of the physical variable are desired, and this is only possible if the characteristic output curve of the sensor used is known and calibrates or recalibrates itself automatically.

It is known that in conventional non-automatic calibrations of a sensor used for measurements, the corresponding values of the output signal f[x] of the sensor are determined point by point for each value of the physical variable x to be measured by means of a measuring device that is as precise as possible. Re-calibrations or calibrations are then generally required from time to time, for example at fixed time intervals.

An automatic calibration process is known from the published document "Applied Optics, Feb. 1, 1989, Vol. 28, No. 3, pages 419 to 420, Loss compensated fiberoptic displacement sensor including a lens, E. Bois, S. J. Huard and G. Boisde", in which a self-calibrating and loss-compensating optical distance sensor is described. The distance sensor contains two light conductors for the purpose of self-calibration, the first ends of which are axially offset in relation to each other and are arranged facing a light-reflecting surface of a mobile body moving along the optical axis of the light conductors. The second end of each light conductor is alternately connected to a light diode or to a photo diode. Each light diode emits light and is excited alternately in order to evaluate by means of a microcomputer two signals detected thereupon by the photo-diodes The light emitted reaches the light-reflecting surface via the appertaining light conductor and the reflected light then reaches via the other light conductor one of the photo-diodes whose output signals are transmitted to the microcomputer. The microcomputer in turn holds the reference signal transmitted by the light diode constant via a digital/analog converter and calibrates the measuring arrangement by utilizing the relationship between the sum and the difference of the two detected signals. The relationship is near the zero point proportional to the desired value of the distance when the presence of a parabolic characteristic output curve can be assumed for the sensors.

It is the object of the instant invention to provide a process of the type mentioned initially by using two nearly identical sensors making it possible to calibrate or recalibrate the output curve of a first one of the two sensors by using the measuring results of the second sensor without rigorous requirements as far as the configuration of the output curve of the sensors is concerned and without any other overly restrictive conditions.

SUMMARY OF THE INVENTION

In accordance with an illustrative embodiment of the invention, a calibration process utilizes two nearly identical sensors. The characteristic output curve of the first sensor is obtained using the measuring outputs of the second sensor. In particular, the first sensor has a characteristic output curve f[x] where x is a physical variable to be measured. The second sensor has an output curve $y[x]=f[x+a]$, where a is a predetermined differential amount of the variable x. Starting from an initially, and at least approximately, known portion of the curve f[x], outputs of the second sensor are used to extend the known portion of the characteristic output curve f[x] of the first sensor into ranges of the variable x where the function f[x] is not currently known.

DESCRIPTION OF THE DRAWING

Identical reference numbers designate identical parts in all figures of the drawing.

DETAILED DESCRIPTION OF THE INVENTION

Each of the arrangements shown in the drawing contains a first sensor 1, a second sensor 2, a computer 3 and a display 4 which together are contained in a measuring arrangement 5.

Figure 1:
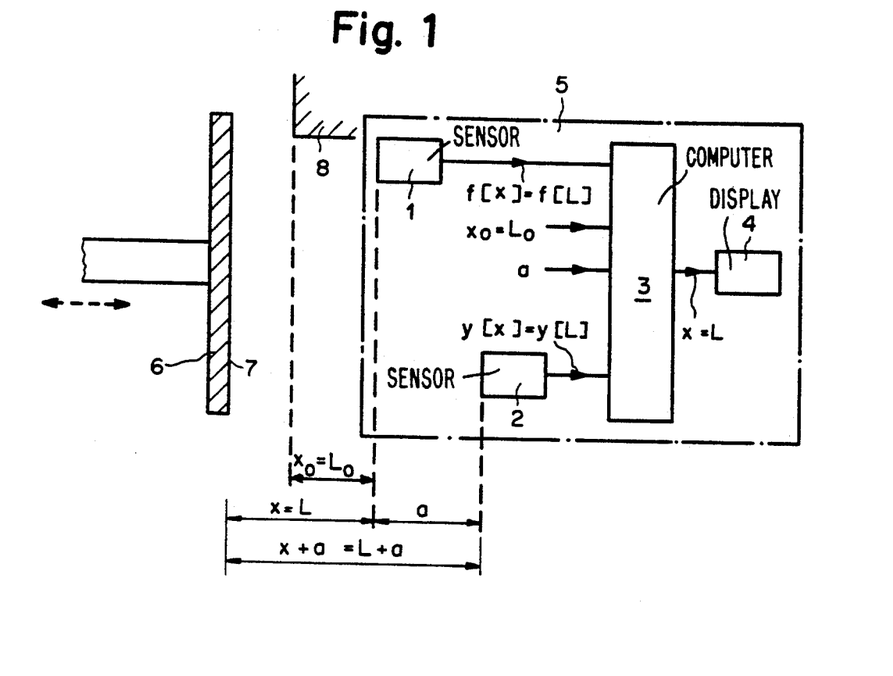
FIG. 1 illustrates a basic design of a distance-measuring arrangement to carry out the process according to the instant invention.
Figure 2:
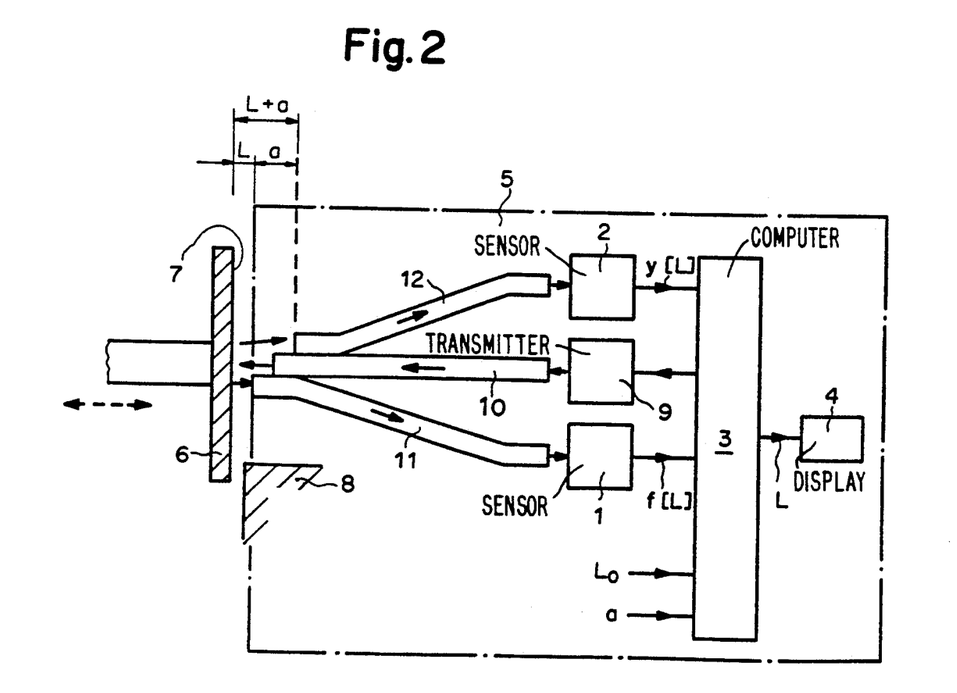
FIG. 2 illustrates a basic design of an optical distance-measuring arrangement to carry out the process according to the invention.
Figure 3:
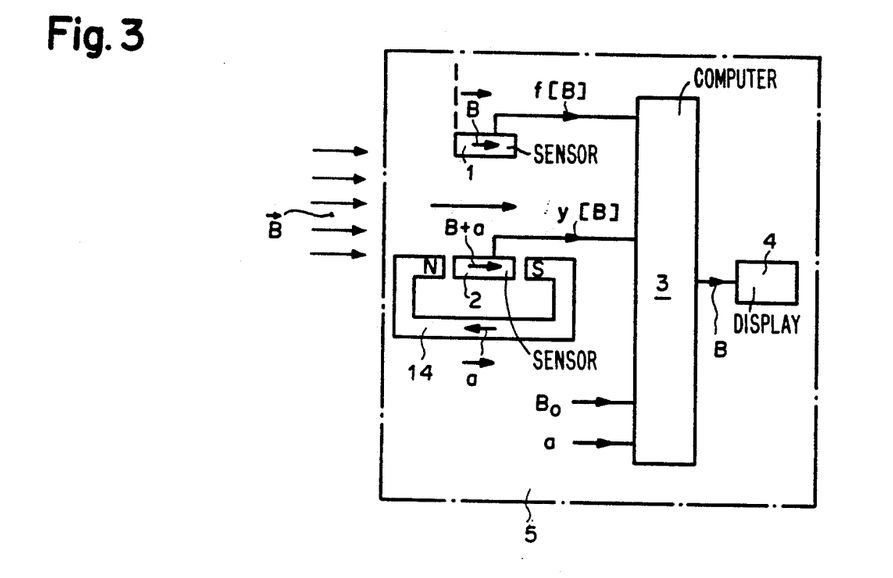
FIG. 3 illustrates a basic design of a magnetic field-measuring arrangement to carry out the process according to the invention.

The values of any physical variable to be measured are designated hereinafter by x. In FIGS. 1 and 2 it is assumed that the physical variable x is a distance between a movable body 6 with a frontal surface 7 and an active frontal surface of sensor 1, the values of which are designated by L so that x=L applies. The physical variable measured in FIG. 3 is a magnetic induction so that x=B applies.

The two sensors 1 and 2 determine values x of the same physical variable. Sensor 1 has an output signal f[x] and sensor 2 an output signal g[x], each of which is a function of the physical variable x. The design of the two sensors 1 and 2 is nearly identical so that their output signals f[x] and g[x] are nearly identical functions of the physical variable x but are initially unknown. The two output curves of the sensors 1 and 2 in which each of the values x is entered as an abscissa value are here either unknown, as mentioned earlier, or have become unknown if they had been known before because they are unstable.

In the measuring arrangement the two sensors 1 and 2 determine values of the physical variable which they distinguish from each other through a predetermined constant differential value a of the physical variable. For values of the physical variable x to be measured, sensor 1 has an output signal f[x] and sensor 2 an output signal $y[x] = g[x+a] \approx f[x+a]$. The differential value a is stored in the computer 3.

Each of the outputs of the two sensors 1 and 2 is connected to an input of computer 3 so that the latter receives the output signals f[x] and y[x] of the two sensors 1 and 2 in form of measuring data which it evaluates to determine from them a value of the physical variable x which is desired. The found value of the variable x is then transmitted to an output of computer 3 for the purpose of further evaluation or display. The found value of the physical variable x can then go from the output of computer 3 to an input of display 4, for instance, in which it is displayed.

A chosen initial value $x_o$ of the variable x is known, either because it is predetermined or because it has been determined at the beginning of the measurement by means of a precision measuring instrument. Associated with the initial value $x_o$ is a value $f[x_o]$ of the output signal f[x] of the sensor 1. The values of $f[x_o]$ and $x_o$ are stored in the computer 3 and represent the coordinate values of an initial point A (see FIG. 5) of the output curve of sensors 1 and 2.

At least the output curve of sensor 1 is subdivided into partial measuring ranges which are given indices k, where k=0, 1, 2, 3 etc. The width of the partial measuring ranges measured in the direction of abscissa values is selected to be equal to the predetermined constant differential value a of the physical variable x measured by the sensors 1 and 2. The measuring results of sensor 2 serve to gradually augment a known portion of this characteristic output curve in the direction of increasing values of the physical variable x by new partial measuring ranges determined in the course of measuring, starting from the known coordinate values $f[x_o]$ and $x_o$ of the initial point A of said output curve of sensor 1, whereby two adjoining known partial measuring ranges overlap each other at least for one abscissa value of the output curve, i.e. for a value $x_k$ of the physical variable. Sensor 2 thus carries out calibration or recalibration of sensor i automatically and purposefully by continuously augmenting the known characteristic curve range of sensor 1 so that sensor 1 thereby learns to know its own output curve. In every instance sensor 1 thereby determines the desired value of the physical variable x only in those partial measuring ranges of its output curve in which the values of the output curve have already been found by means of the measuring results of sensor 2.

In the drawing of FIG. 1 the two sensors 1 and 2 are mounted at a distance a, measured parallel to the direction of the distance x=L, so that the distance between the active frontal surface of sensor 2 and the active frontal surface 7 of the movable body 6 has a value of x+a=L+a. The distance between the frontal surface 7 of the movable body 6 and a mechanical stop 8 has a known initial value $x_o = L_o$ which can be zero for example, again as measured parallel to the direction of the distance x=L, when the frontal surface 7 of the movable body 6 is initially in contact with the mechanical stop 8. The measuring arrangement 5 shown in FIG. 1 comprises the two sensors 1 and 2, the computer 3 and the display 4.

In FIG. 2 an optical design variant of the distance measuring arrangement shown in FIG. 1 is shown. The frontal surface 7 of the movable body 6 is in this case preferably a reflecting surface which is irradiated with visible or invisible light by a light transmitter 9 via a first light conductor 10. The light transmitter 9 can be a light diode supplied by a current which is fed or controlled via computer 3. The frontal surface 7 is at a distance L or L+a from the faces of two more light conductors 11 and 12 whose faces, measured parallel to the direction of distance L, are offset against each other by a distance a. The two light conductors 11 and 12 can first run parallel and in contact with the light conductor 10 and can then distance themselves from the latter in order to achieve a vertical connection to a frontal surface of one of the sensors 1 or 2, both of which can be diodes, for example. The light conductor 11 whose face is at a distance L from the frontal surface 7 is connected to sensor I while the light conductor 12 is connected to sensor 2. The faces of the light conductors 11 and 12 which are turned towards the frontal surface 7 represent the active frontal surfaces of the two sensors 1 and 2. The two sensors 1 and 2, the computer 3, the display 4, the light transmitter 9 and the three light conductors 10 to 12 constitute the measuring arrangement 5 in the drawing of FIG. 2.

A magnetic induction B is measured in the magnetic field measuring arrangement shown in FIG. 3. The measuring arrangement 5 in this case comprises the two sensors 1 and 2, the computer 3, the display 4 and a permanent magnet 14. Sensors 1 and 2 are this time preferably Hall elements, both of which can be supplied with a direct and constant current. Sensor 1 only measures the magnetic induction B while sensor 2 measures a magnetic induction B+a, whereby a small differential induction a is produced by the permanent magnet 14. On the permanent magnet 14 the north pole is designated by N and the south pole by S. The permanent magnet 14 is arranged in space so that the magnetic induction B to be measured and the magnetic differential induction a of the permanent magnet 14 are added together. Sensor 2 is placed in a magnetic discontinuity of the permanent magnet 14 and measures the sum B+a of the two magnetic inductions B and a. In FIG. 3 the following therefore applies: x=B, x+a=B+a and $x_o = B_o$. Preferably $x_o = B_o = 0$ is selected, e.g. by switching off the induction to be measured at the beginning of the process.

FIGS. 1 to 3 symbolically show the storing of the initial value $x_o = L_o$ or $x_o = B_o$ and of the differential value a in computer 3 in that each of these values is brought to an input of the computer 3.

Figure 4:
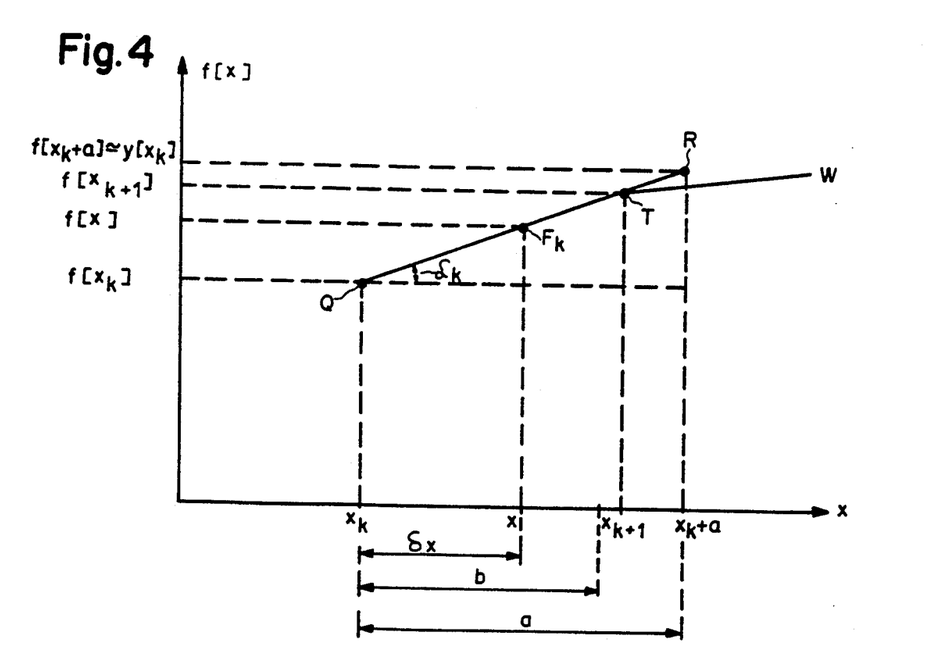
FIG. 4 illustrates a partial measuring range of the output curve of a sensor used in the process according to the invention.

Instead of the optical and magnetic solutions described it is also possible to use acoustic, pneumatic or micro-wave systems, with the sensors 1 and 2 having then to be replaced by corresponding acoustic, pneumatic or micro-wave sensors. In FIG. 4 the output signal f[x] of sensor 1 is represented as a function of the physical variable to be measured within a partial measuring range which has the index k. The partial measuring range has a width in the direction of the abscissa which is equal to the known, predetermined differential value a of the physical variable. The differential value a is always selected sufficiently small so that within each partial measuring range an appertaining part of the output curve of sensor 1 can be assumed to be linear.

Within the partial measuring range represented in FIG. 4, an initial point Q of the appertaining linear portion of the output curve has the coordinate values $f[x_k]$ and $x_k$ while an end point R of the linear portion has the coordinate values $f[x_k+a] \approx g[x_k+a] = y[x_k]$ and $x_k+a$. The portion QR of the output curve of sensor 1 belonging to the partial measuring range takes a linear course between the two points Q and R so that the abscissa value x for each measured point $F_k$ located on this portion QR of the output curve and having the coordinate values $f[x]$ and x which is equal to a desired value x of the physical variable can be determined by extrapolation by means of the formulas $x = x_k + \delta x$ and $\delta x = \{f[x]] - f[x_k]\}/tg\alpha_k$, where $tg\alpha_k = \{f[x_k+a] - f[x_k]\}/a \approx \{y[x_k] - f[x_k]\}/a$ represents the inclination of the appertaining linear portion of the output curve.

For as long as the difference $\delta x$ between the just determined value of the desired physical variable and the lowest value $x_k$ in the applicable partial measuring range (which has for example an index k) is greater than zero and less than a predetermined constant value b, no change-over to another partial measuring range takes place. The predetermined constant value b is selected to be less than the predetermined constant differential value a of the physical variable x and is stored in computer 3. If however a positive value of the difference $\delta x$ reaches or exceeds the predetermined constant value b as for example at measuring point T, a change-over from the partial measuring range which has just been applicable to an adjoining, higher partial measuring range takes place.

If the value of the difference $\delta x$ is positive and greater than or equal to the predetermined constant value b, a switchover to a new, adjoining partial measuring range which is located in the direction of increasing values of the physical variable takes place, and the index $k+1$ of the new partial measuring range is greater by a value of one than the index number k of the partial measuring range which has just previously been applicable. If for example the measuring point T lies on the straight line QR and has the coordinate values $f[x_k+1]$ and $x_k+1$, a change-over from the applicable partial measuring range with the index k to the next higher partial measuring range with an index $k+1$ takes place since the value of the difference $\delta x$ is positive and greater than b. The initial point of the portion TW of the curve of the new partial measuring range with the index $k+1$ is in that case the measuring point T while its end point which is no longer shown in FIG. 4 has the coordinate values $f[x_{k+1}+a] \approx y[x_{k+1}]$ and $x_{k+1}+a$.

If the value of the difference $\delta x$ is however negative, a change-over to a new adjoining partial measuring range located in direction of the decreasing values of the physical variable always takes place and the index $k-1$ of the new partial measuring range is selected to be lower by a value of one than the index k of the now applicable partial measuring range, whereby $k-1$ must always be greater than or equal to zero.

Figure 5:
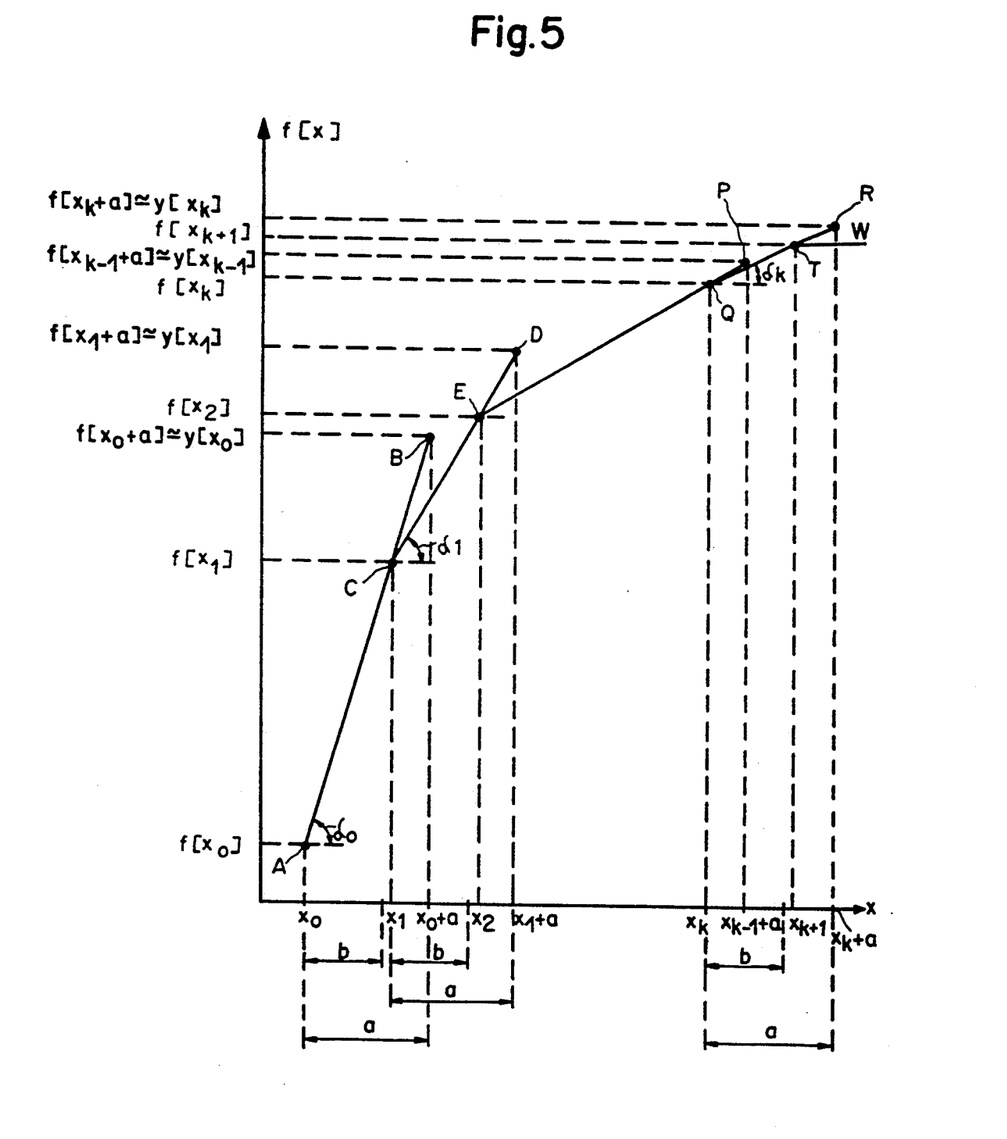
FIG. 5 illustrates an output curve of a sensor comprising several partial measuring ranges in the process according to the invention.

In FIG. 5 the output signal $f[x]$ of sensor 1 for several overlapping partial measuring ranges in a row is represented as a function of the physical variable x. A straight line ACB is that portion of the curve of sensor 1 which belongs to the partial measuring range with the index number $k=0$. A straight line CED is that portion of the curve which belongs to the partial measuring range with the index $k=1$. A straight line EQP belongs to the group of partial measuring ranges, otherwise not described in greater detail, with the indices $k=2$ to $k=k-1$. The straight line QTR is that portion of the curve which belongs to the partial measuring range with the serial number $k=k$. The straight line TW is that portion of the curve which belongs to the partial measuring range with the serial number $k=k+1$. The coordinates of the initial points A,C,E,Q and T of the mentioned portions of the curve are here respectively $f[x_k]$ and $x_k$ and those of the end points B, D, P and R are respectively $f[x_k+a] \approx y[x_k]$ and $x_k+a$, whereby k has in each instance the value of the index of the appertaining partial measuring range. The initial point A which is at the same time the initial point of the overall curve thus has the initial values $f[x_o]$ and $x_o$ as its coordinate values, these being known at the beginning of the process and being stored in computer 3 at that time. The initial points C, E, Q and T are measuring points which each belong to the portions of the curve of two adjoining partial measuring ranges, i.e. to the partial measuring range with the appertaining index k and to the preceding partial measuring range with the index $k-1$.

When a positive difference $\delta x$ between the just determined value of the physical variable and the lowest value $x_{k-1}$ present in the now applicable partial measuring range reaches or exceeds the predetermined constant value b, and when the new partial measuring range with the index number k has not been reached until now in the course of the calibration and measuring process, then the new partial measuring range is a measuring range whose linear portion was not known until now by the output curve. The initial point of the output curve in the new partial measuring range then contains as its coordinate value the value $x_k$ which has just been determined for the physical variable and the appertaining value of the output signal $f[x_k]$ of sensor 1. The end point of the output curve in the new partial measuring range contains as coordinate values the value $x_k+a$ of the physical variable increased by the differential value a and the presently applicable value of the output signal $y[x_k] \approx f[x_k+a]$ of sensor 2.

When a changeover from a known partial measuring range to a following, higher, as yet unknown partial measuring range with the index number k takes place, the presently applicable value $f[x_k]$ of the output signal $f[x]$ of sensor 1 is determined for the value $x_k$ of the physical variable and the presently applicable value $y[x_k]$ of the output signal $y[x]$ of sensor 2 is determined for the value $x_k+a$ of the physical variable. The two found values $f[x_k]$ and $y[x_k]$, the value $x_k$ of the physical variable which triggers the change-over as well as an appertaining value of $tg\alpha_k = \{y[x_k] - f[x_k]\}/a$ are respectively stored in computer 3 under the serial number k of the new partial measuring range.

Following this, the then applicable value of a variable m is incremented by a value of one. The variable m indicates here the highest value of the index k of the partial measuring ranges reached until then in the course of the measurements.

Within a known partial measuring range with the index k the value x of the physical variable appertaining to a just determined value of the output signal $f[x]$ of sensor 1 is calculated by computer 1 by using the formulas $\delta x = \{f[x] - f[x_k]\}/tg\alpha_k$ and $x = x_k + \delta x$.

In the first partial measuring range with the index $k=0$ the value $x_k$ of the physical variable which triggers the change-over and the appertaining value $f[x_k]$ of the output signal $f[x]$ of sensor 1 are the known coordinate values $x_o$ and $f[x_o]$ of the initial point A of the output curve.

Figure 6:
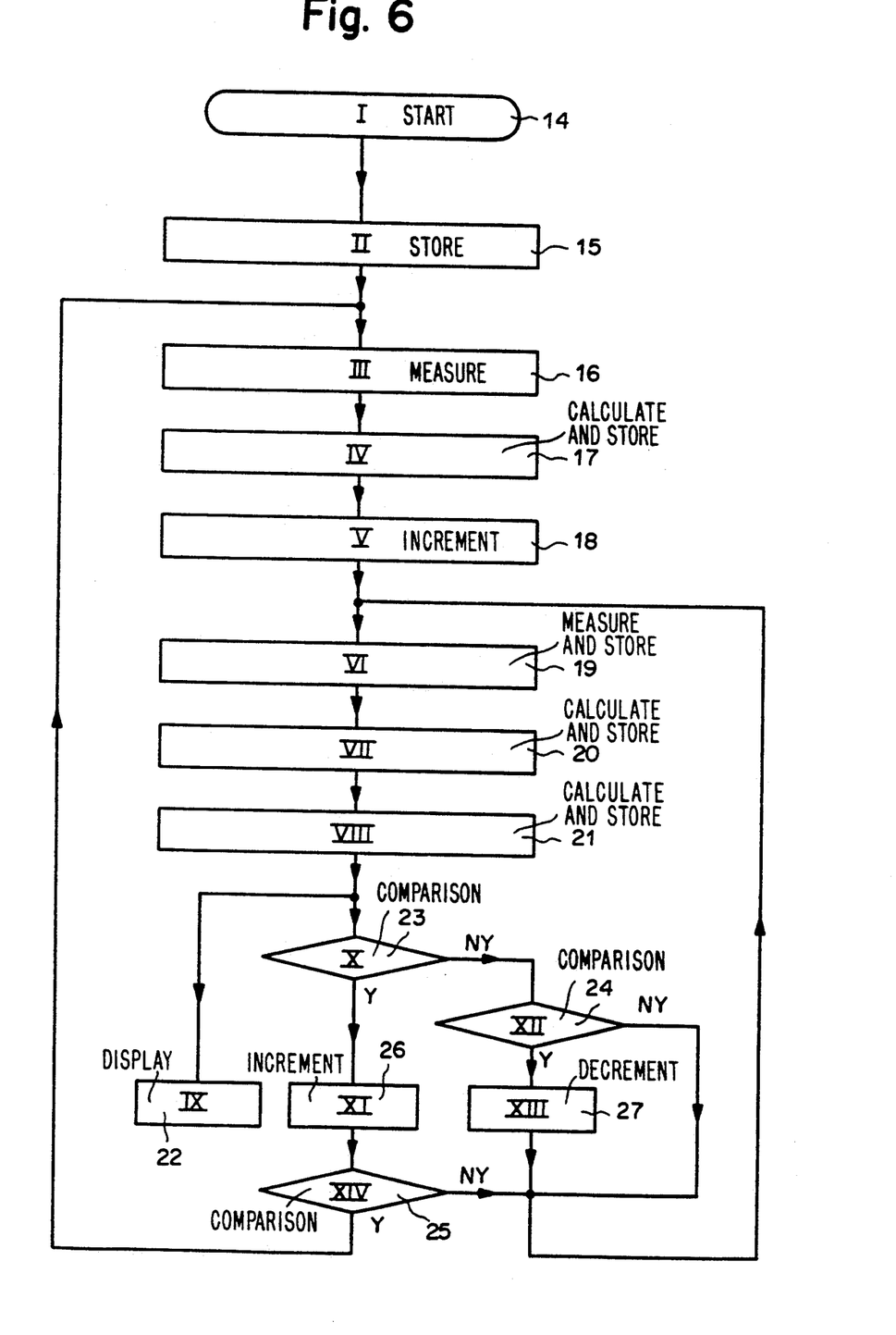
FIG. 6 illustrates a flow diagram of a program of a computer used for the process according to the invention.

The flowchart of the program of computer 3 contains nine function blocks 14, 15, 16, 17, 18, 19, 20, 21 and 22 which are connected in the sequence indicated and each of which contains in the indicated sequence one of the nine following functions I to IX:

| | |
|---|---|
| Function I | : "Start" and actively set the value of x to value $x_o$; |
| Function II | : "Store the known output values $x = x_o$, $k = 0$ and $m = 0$ as well as the known values a and b"; |
| Function III | : "Measure simultaneously and store thereafter the values $f[x_k]$ and $y[x_k]$ of the output signals of the two sensors 1 and 2 as well as the appertaining value $x = x_k$ of the physical variable"; |
| Function IV | : "Calculate and store the value $tga_k = \{y[x_k] - f[x_k]\}/a$"; |
| Function V | : "Increment the value of the variable m by a value of one"; |
| Function VI | : "Measure and store the current value of the output signal f[x] of the first sensor 1"; |
| Function VII | : "Calculate and store the value of $\delta x = \{f[x] - f[x_k]\}/tga_k$"; |
| Function VIII | : "Calculate and store the value of $x = x_k + \delta x$" and |
| Function IX | : Display the calculated value of x". |

In addition the flowchart shown in FIG. 6 contains three decision blocks 23, 24 and 25 as well as two function blocks 26 and 27 each of which contains one of the functions X, XII, XIV, XI or XIII in the sequence indicated. Each of the NO exits of the function blocks 23 to 25 is marked NY ("Not Yes") while each YES exit is marked Y (Yes).

The output signal of function block 21 supplies in addition to the input of the function block 22 also the input of the decision block 23 whose NO exit NY goes to the input of the decision block 24 while its YES exit Y goes via function block 26 to the input of the decision block 25. The YES exit of the decision block 24 goes to the input of function block 27 the exit of which is connected to the NO exits NY of the decision blocks 24 and 25 as well as to the input of the function block 19. The YES exit Y of the decision block 25 is connected to the input of the function block 16.

The functions X to XIV are as follows:

Function X: "If $\delta x$ is greater than or equal to b",

Function XI: "Increment the value of k by a value of one",

Function XII: "If $\delta x$ is less than zero",

Function XIII: "Decrement the value of k by a value of one", and

Function XIV: "If the incremented value of k is greater than or equal to the now applicable value of m".

The function blocks 14 and 15 are gone through only once at the beginning of the process and serve to set the value of the physical variable x actively to value $x_o$, e.g. by switching off the induction to be measured or by shifting the movable body up to the contact with the mechanical stop 8, to store the already initially known values of $x_o$, a and b in the computer and to reset the value of k and m to zero.

The function blocks 16 to 18 are gone through at the beginning of each new heretofore unknown partial measuring range in order to find the new value $tga_k$ of the slope of the linear portion of the curve in the new, heretofore unknown partial measuring range by means of the found values of $x_k$, $f[x_k]$ and $y[x_k]$. In the course of the process, the slope $tga_k$ of the corresponding linear portion of the characteristic output curve of sensor 1 is thus found for each of the individual, as yet unknown partial measuring ranges and with it the course of the entire characteristic output curve of sensor 1 for all partial measuring ranges in sequence. Upon calculating the new value $tga_k$ the value of m which was applicable until now is increased by a value of one because the new partial measuring range is now no longer unknown.

The function or decision blocks 19 to 27 are gone through with each measuring and serve on the one hand to find the value of x and $\delta x$ and on the other hand to determine whether the value of the difference $\delta x$ is greater than or equal to the preceding value b or smaller than zero. If not, no change-over of a partial measuring range takes place. If yes, a change-over of the applicable partial measuring range to a higher or lower partial measuring range occurs through an incrementation or decrementation of the then applicable value of k by a value of one. If an incremented value of k is furthermore greater than the then applicable value of m or equal to that value, then the new partial measuring range is still an unknown partial measuring range and the program returns back to the input of the function block 16 to find its heretofore unknown value of $tga_k$. In all other cases however a change-over to a known partial measuring range or no change-over of a partial measuring range takes place and the program returns to the input of function block 19 where it remains at disposal for a further measurement.

The program run is subdivided below into groups of program runs where those sequential measurements whose measured results are all within one and the same partial measuring range with an index number k belong to each group. In the first run of each group, each of the appertaining portions of the characteristic output curve of the sensor 1 is determined here by means of the measured results of sensor 2.

The process according to the instant invention then progresses as follows according to FIG. 6:

In a first group of program runs which appertain to measurements with all measured results situated within a partial measuring range with the serial number k=0 the following functions are performed:

Following storage of the values of a and b and of the values $x=x_o$, k=0 and m=0 in the computer 3 (see function block 15), the values $f[x_o]$ and $y[x_o]$ of the output signals of the two sensors 1 and 2 are determined and are stored in computer 3 under the index k=0 (see function block 16). Because the two curves f[x] and g[x] of the sensors 1 and 2 are nearly equal the thus found two measuring points A and B (see FIG. 5) with the coordinate values $f[x_o],x_o$ and $y[x_o] \approx f[x_o+a],x_o+a$ are within the then applicable partial measuring range on the characteristic output curve of sensor 1 which is assumed to follow a linear course between the two values $x_o$ and $x_o+a$ as mentioned earlier.

Since the coordinate values of the two measuring points A and B located on this linear portion of the characteristic output curve are known it is possible to calculate the value $tga_k=tga_o=\{y[x_o]-f[x_o]\}/a$ of the slope by means of computer 3 and to store it within it under the index number k=0 (see function block 17).

The then applicable value m is then incremented by a value of one (see function block 18).

Because $f[x]=f[x_k]=f[x_o]$ applies for the first measurement, the function and decision blocks 19 to 27 can be disregarded for the moment since $\delta x - 0$ and $x = x_k = x_o$. In other words: Although the program runs in the first measurement through the function blocks 19 to 27 it nevertheless returns to the input of function block 19 to trigger the next measurement without change-over of a partial measuring range.

Since the coordinate values $f[x_o], x_o$ of the initial point A and the value of $tg\alpha_o$ for the then applicable partial measuring range with the index $k=0$ are known, the abscissa values of each intermediate point $F_k = F_o$ of the characteristic output curve of sensor can be calculated by computer 3 in this partial measuring range between the measuring points A and B by means of the formulas $$x = x_o + \delta x \quad (I) \text{ and}$$

$$\delta x = \{f[x] - f[x_o]\}/tg\alpha_o \quad (II)$$

(see function blocks 19 to 21), where $f[x]$ and $x$ are the coordinate values of the intermediate point $F_k = F_o$ (see FIG. 4). The portion AB of the characteristic output curve of sensor 1 and thereby the appertaining partial measuring range are thus known.

For as long as the found values $\delta x$ are greater than or equal to zero but less than the predetermined value b in the subsequent measurements no change-over of a partial measuring range takes place (see decision blocks 23 and 24) and the desired value of x is each time calculated by computer 3 by means of the formulas I and II for all measurements. The program goes once through the function or decision blocks 19 to 27 for each of these measurements.

In a subsequent second group of program runs pertaining to measurements whose measuring results are all within a partial measuring range with the serial number $k=1$, the following functions are performed:

Upon completion of each measurement, a verification is made to ascertain whether the newly found value of $\delta x$ is less than zero or greater than or equal to b (see function and decision blocks 23 and 24). If this is the case for the first time for a measured value $x = x_k = x_1$ with a positive value of $\delta x$ a first change-over takes place from a then applicable partial measuring range with the index $k=0$ to an adjoining, next highest partial measuring range with the index $k=1$ (see function block 26). When the new partial measuring range is still unknown the index $k=1$ of the new partial measuring range is greater than or equal to m (see decision block 25.) In that case the program returns to the input of the function block 16 and by means of the current measuring result of sensor 2 it calculates a new value of $tg\alpha_k = tg\alpha_1$ of the linear portion CD of the output line of sensor 1 which now applies in the new partial measuring range (see function block 17 and FIG. 5)

With $k=1$ the following formula applies here:

$$Tg\alpha_k = \{y[x_k] - f[x_k]\}/a \quad (III).$$

The then applicable value of m is then again incremented by a value of one (see function block 18)

Because the coordinate values $f[x_1], x_1$ of the initial point C and the value of $tg\alpha_1$ of the slope for the applicable partial measuring range with the serial number $k=1$ are now known, any intermediate point $F_k = F_1$ of the characteristic output curve of sensor 1 between the measuring points C and D can be calculated by the computer 3 for $k=1$ by means of the formula $$x = x_k + \delta x \quad (IV) \text{ and}$$

$$\delta x = \{f[x] - f[x_k]\}/tg\alpha_k \quad (V)$$

(see decision blocks 19 to 21), whereby $f[x]$ and $\delta x$ are again the coordinate values of the intermediate point $F_k$. The portion CD of the characteristic output curve of sensor 1 and thereby of the appertaining partial measuring range are thus again known. The previously known portion AB of the output line of sensor 1 has thus been enlarged upwards by the portion CD.

For as long the newly determined values of $\delta x$ are positive and less than the predetermined value b in the subsequent measurements, again no new change-over of a partial measuring range takes place (see the decision blocks 23 and 24) and the desired value of x is in each instance calculated by computer 3 by means of the formulas IV and V. For each of these measurements the function and decision blocks 19 to 27 are here again gone through once.

In the subsequent additional groups of program runs appertaining to the measurements, the measured results of which are all situated in a partial measuring range with an index k the following functions are performed (also see FIGS. 4 and 5):

Upon completion of each measurement in a partial measuring range with the serial number $k-1$ a verification is made each time to ascertain whether the newly found value of $\delta x$ is less than zero or greater than or equal to b (see decision blocks 23 and 24). When this is the case for the first time for a measured value $x = x_k$ with a positive value of $\delta x$, a change-over occurs from the then applicable partial measuring range to an adjoining, next highest partial measuring range with the index k by incrementing the index k by a value of one (see function block 26). If the new index k is greater than or equal to m (see decision block 25), the new partial measuring range is still an unknown partial measuring range and the program returns to the input of the function block 16 in order to find the value of $tg\alpha_k$ for the new partial measuring range by using the then current measuring results of sensor 2 (see function block 17) while the value of m is incremented by a value of one (see function block 18). When the value of $\delta x$ is negative a change-over occurs from the then applicable partial measuring range to an adjoining, next lowest partial measuring range which is already known by decrementing the current number of the then applicable partial measuring range by a value of one (see function block 27).

If the characteristic output curve of sensors 1 and 2 is unstable, the described process must be performed again from time to time or periodically, for example by producing a new "Start" in the program of computer 3, in order to re-calibrate the characteristic output curve.

Finally, the above-described embodiments of the invention are intended to be illustrative only. Numerous alternative embodiments may be devised by those skilled in the art without departing from the spirit and scope of the following claims.

We claim:

1. A process for operating a measuring system comprising first and second sensors and a computer in communication with the first and second sensors for determining a characteristic output curve of said first sensor for measuring a physical variable, said process comprising the steps of:

providing said first sensor having an initially unknown output characteristic curve which is a function $f(x)$ of a physical variable x to be measured, providing said second sensor having an initially unknown output characteristic curve which is a function $y(x)$ of said physical variable x, where $y(x) \approx f(x+a)$, where a is a predetermined differential amount of the physical variable x to be measured, utilizing said computer in communication with said first and second sensors to determine said unknown output characteristic curve $f(x)$ of said first sensor by the steps of:

sensing with said first and second sensors a known initial value $x_o$ of said physical variable x for obtaining outputs $f(x_o)$ and $y(x_o) \approx f(x_o+a)$ of said first and second sensors in response to the known initial value $x_o$ of the physical variable x, transmitting said outputs $f(x_o)$ and $y(x_o) \approx f(x_o+a)$ of said first and second sensors to said computer, utilizing said outputs $f(x_o)$ and $f(x_o+a)$ of said first and second sensors for determining by said computer a first partial measuring range of said characteristic output curve $f(x)$ having a width a, an index $k=0$, and having a starting point $f(x_o), x_o$ and an ending point $f(x_o+a)$, $x_o+a$, enlarging a known portion of said initially unknown output characteristic curve $f(x)$ of said first sensor by determining additional partial measuring ranges of width a and index values k, $k=1,2,\ldots$, each additional partial measuring range of index k being determined by sensing with said first and second sensors a value $x_k$ of said physical variable and obtaining the outputs $f(x_k)$ and $y(x_k) \approx f(x_k+a)$ of said first and second sensors in response to the value $x_k$ of said physical variable x, transmitting the outputs $f(x_k)$ and $y(x_k)$ to said computer and utilizing said outputs $f(x_k)$ and $f(x_k+a)$ for determining by said computer a partial measuring range of said characteristic output function $f(x)$ having a starting point $f(x_k)$, $x_k$ within a previously determined partial measuring range and an ending point $f(x_k+a)$, $x_k+a$, outside a previously determined partial measuring range, and measuring by said first sensor a desired value of said physical variable x within a particularly applicable one k of said previously determined partial measuring ranges of the output characteristic curve $f(x)$ of the first sensor.

2. Process as in claim 1, wherein the known, predetermined differential value a of the physical quantity is selected sufficiently small so that within each partial measuring range the appertaining portion of the characteristic output curve of the first sensor can always be assumed to be linear and in that the slope of the appertaining linear portion of the characteristic output curve of the first sensor is determined by said computer for each of the partial measuring ranges.

3. Process as in claim 1, wherein said step of measuring a desired value of the physical variable x comprises utilizing said computer to change said particular applicable partial measuring range k to an adjoining partial measuring range to measure said desired value of the physical variable x when the difference $\delta x$ between the desired value x determined utilizing the particular applicable measuring range k and the lowest value $x_k$ occurring in the particular applicable partial measuring range k is less than zero or has reached or exceeded a predetermined constant value b which is less than the predetermined constant differential value a of the physical variable.

4. Process as in claim 3, wherein when a value of the difference $\delta x$ between the desired value x obtained utilizing the particular applicable measuring range k and the lowest value $x_k$ in said particular applicable partial measuring range k is positive and greater than or equal to the predetermined value b, utilizing said computer to change to a new adjoining partial measuring range located in direction of increasing values of the physical variable and in that the index $k+1$ of the new partial measuring range is selected to be higher by a value of one than the index k of the particular applicable partial measuring range, and in that, when a value of the difference $\delta x$ between the desired value of x obtained utilizing said particular applicable measuring range k and the lowest value $x_k$ in the particular applicable partial measuring range is negative, utilizing said computer to change to a new adjoining partial measuring range located in the direction of decreasing values of the physical variable and wherein the index number $k-1$ of the new partial measuring range is selected lower by a value of one than the index k of the particular applicable partial measuring range.

5. Process as in claim 4, wherein when a positive difference $\delta x$ between a value of x obtained utilizing said partial measuring range $k-1$ and the lowest value $x_{k-1}$ found in the partial measuring range $k-1$ reaches or exceeds the predetermined constant value b and when a new partial measuring range of index k has not yet been determined in said process, then the initial point of the characteristic output curve $f(x)$ in the new partial measuring range is given as a starting point coordinates the desired value $x_k$ of the physical variable just determined using the partial measuring range $k-1$ and the appertaining value of the output signal $f(x)$ of the first sensor and in that the end point of the output curve $f(x)$ in the new partial measuring range is given as coordinate values the value $x_k+a$ of the physical variable increased by the predetermined constant differential value a and the value of the output signal of the second sensor $y(x_k) \approx f(x_k+a)$.

6. Process as in claim 5, characterized in that when a change-over occurs from a determined to a next highest, still undetermined partial measuring range with the index k, the applicable value $f(x_k)$ of the output signal of the first sensor and the applicable value $f(x_k+a)$ of the output signal of the second sensor are obtained for the value $x_k$ of the physical variable which triggers the change-over, and wherein the two values $f(x_k)$ and $f(x_k+a)$ which have been found the triggering value $x_k$ of the physical variable as well as a value of $tga_k = \{f(x_k+a) - f(x_k)/a\}$ are stored in said computer corresponding to the index k of the new partial measuring range, while a variable m which indicates the highest value of the index k of the partial measuring ranges that has been reached until then in the course of the process is incremented by a value of one.

7. Process as in claim 6, wherein the value $x_k$ of the physical variable triggering the change-over and the appertaining value $f(x_k)$ of the output signal $f(x)$ of the first sensor are the known coordinate values $x_o, f(x_o)$ of the initial point of the characteristic output curve in the first partial measuring range with the index $k=0$.

8. Process as in claim 6 wherein a desired value x' of the physical variable x corresponding to an output signal $f(x')$ of the first sensor is determined by the computer using the formula $\delta x = \{f(x') - f(x_k)\}/tga_k$ and $x' = x_k + \delta$ within a known partial measuring range with the index k.

9. A process for operating a measuring system comprising first and second sensors and a computer in communication with the first and second sensors for determining an output characteristic curve of said first sensor for measuring a physical variable x, said process comprising providing said first sensor having a characteristic output curve f(x) which is a function of the variable x to be measured, providing said second sensor having a characteristic output curve $y(x) \approx f(x+a)$ which is a function of the variable x to be measured, where a is a predetermined differential amount of the variable x, and staring from a known portion of the characteristic output curve f(x) of the first sensor, utilizing said second sensor to extend the known portion of the characteristic output curve f(x) of the first sensor by sensing using said first and second sensors a value $x_k$ of said physical variable for obtaining outputs of said first and second sensors in response to said value $x_k$ of the physical variable x such that the output of the first sensor $f(x_k)$ is within the known portion of the characteristic output curve of the first sensor and the output $f(x_k+a)$ of the second sensor is outside the known portion of the characteristic output curve of the first sensor, transmitting said outputs of said first and second sensors to said computer receiving said outputs of said first and second sensors at said computer and utilizing the computer to extrapolate the values of the characteristic output curve of the first sensor between $f(x_k)$ and $f(x_k+a)$ from said outputs, and measuring by said first sensor a value of said physical variable to generate an output which is located on a portion of the characteristic output curve determined by said computer.

* * * * *